US011746291B2

(12) United States Patent
Hong et al.

(10) Patent No.: US 11,746,291 B2
(45) Date of Patent: Sep. 5, 2023

(54) METHOD FOR PRODUCING A QUANTUM DOT NANOPARTICLES, QUANTUM DOT NANOPARTICLES PREPARED BY THE METHOD, QUANTUM DOT NANOPARTICLES HAVING A CORE-SHELL STRUCTURE, AND LIGHT EMITTING ELEMENT

(71) Applicants: SHIN-A T&C, Seoul (KR); UNIAM, Seoul (KR)

(72) Inventors: Seung Mo Hong, Incheon (KR); Jin Han Song, Seoul (KR); Hyeok Jin Hong, Suwon-si (KR); Seok Kyu Park, Seoul (KR); Ju Young Lee, Bucheon-si (KR); In Won Lee, Seoul (KR)

(73) Assignees: SHIN-A T&C, Seoul (KR); UNIAM, Seoul (KR)

( * ) Notice: Subject to any disclaimer, the term of this patent is extended or adjusted under 35 U.S.C. 154(b) by 464 days.

(21) Appl. No.: 16/941,746

(22) Filed: Jul. 29, 2020

(65) Prior Publication Data
US 2021/0040387 A1 Feb. 11, 2021

(30) Foreign Application Priority Data

Aug. 5, 2019 (KR) .................. 10-2019-0094983

(51) Int. Cl.
C09K 11/08 (2006.01)
B82Y 40/00 (2011.01)
(Continued)

(52) U.S. Cl.
CPC ........ *C09K 11/883* (2013.01); *C09K 11/0883* (2013.01); *B82Y 20/00* (2013.01); *B82Y 40/00* (2013.01)

(58) Field of Classification Search
CPC ...... C09K 11/00; C09K 11/0883; B82Y 40/00
See application file for complete search history.

(56) References Cited

U.S. PATENT DOCUMENTS 9,570,549 B2 2/2017 Jang et al.
10,029,972 B2 7/2018 Curley et al.
(Continued)

FOREIGN PATENT DOCUMENTS

KR 10-2018-0016196 A 2/2018
KR 10-2018-0060923 A 6/2018
KR 10-2019-0055390 A 5/2019

OTHER PUBLICATIONS

Alun T. Rhys Williams et al., "Relative Fluorescence Quantum Yields Using a Computer-controlled Luminescence Spectrometer" Analyst, Sep. 1983, pp. 1067-1071, vol. 108.
(Continued)

*Primary Examiner* — Matthew E. Hoban
(74) *Attorney, Agent, or Firm* — Sughrue Mion, PLLC

(57) ABSTRACT

A method of preparing a quantum dot nanoparticle is disclosed. The method includes the step of reacting one or more cation precursors including one or more of Groups 12 and 13 elements with one or more anion precursors including one or more of Group 15 elements to prepare a quantum dot nanoparticle, wherein the reaction of the cation precursors and the anion precursors is carried out while supplying a compound represented by Chemical Formula 1. A quantum dot nanoparticle prepared by the preparation method, a quantum dot nanoparticle having a core-shell structure containing the quantum dot nanoparticle as a core, and a light emitting element comprising the quantum dot nanoparticle having a core-shell structure are also disclosed.

14 Claims, 4 Drawing Sheets

(51) Int. Cl.
*C09K 11/88* (2006.01)
*B82Y 20/00* (2011.01)

(56) References Cited

U.S. PATENT DOCUMENTS

| | | | | |
|---|---|---|---|---|
| 2011/0006281 | A1* | 1/2011 | Jang | H10K 50/115 |
| | | | | 252/500 |
| 2017/0137360 | A1* | 5/2017 | Curley | C01B 25/088 |
| 2017/0306227 | A1* | 10/2017 | Ippen | C09K 11/02 |

OTHER PUBLICATIONS

Lisi Xie et al., "The Effect of Trace Water on the Growth of Indium Phosphide Quantum Dots", Chemistry of Materials, Jul. 7, 2015, 9 pgs.

* cited by examiner

METHOD FOR PRODUCING A QUANTUM DOT NANOPARTICLES, QUANTUM DOT NANOPARTICLES PREPARED BY THE METHOD, QUANTUM DOT NANOPARTICLES HAVING A CORE-SHELL STRUCTURE, AND LIGHT EMITTING ELEMENT

CROSS REFERENCE TO RELATED APPLICATION

This application claims benefit of priority based on Korean Patent Application No. 10-2019-0094983 filed Aug. 5, 2019, of which the content is incorporated herein by reference.

TECHNICAL FIELD

The present invention relates to a method of preparing a quantum dot nanoparticle, a quantum dot nanoparticle prepared by the method, a quantum dot nanoparticle having a core-shell structure, and a light emitting element.

BACKGROUND ART

In general, a material has new physical properties that could not be seen in the bulk state when it becomes small to a nanometer size, because the surface area/volume ratio becomes abnormally large compared to the bulk of the materials as materials become small to the size of nanometer level.

Among these nanomaterials, there is a quantum dot (QD), which is a semiconductor material having a diameter of about 2 to 10 nm corresponding to a nano size. The quantum dot is a material showing a quantum confinement effect in which a luminous wavelength differs from that of a bulk state since the electron motion characteristics in the semiconductor material in the bulk state become further restricted when it becomes small to a certain size or less. If this quantum dot reaches the energy excited state by receiving light from an excitation source, it autonomously emits energy according to a corresponding energy band gap. Accordingly, if the size of the quantum dot is adjusted, the corresponding band gap may be adjusted to obtain energy of various wavelength bands, and thus, optical, electrical, and magnetic properties that are completely different from the original physical properties are exhibited.

This quantum dot has recently been used in a wide range of applications, for example, various fields including displays, solar energy conversion, molecular and cell imaging, and the like, and related research is actively being a conducted.

Representative conventional quantum dot may include a quantum dot based on Cd compounds, particularly cadmium selenide (CdSe). However, due to human toxicity and accumulation problems, and the like of Cd, the demand for a Cd-free quantum dot is increasing and its commercialization is required. In addition, the development of a method of preparing a quantum dot nanoparticle having a narrow full width at half maximum and an excellent quantum yield by uniformizing the particle size distribution has been recognized as a very important task in this field.

Recently, in relation to the preparation of the quantum dot nanoparticle having a narrow full width at half maximum and excellent quantum yield, various research results on the effect of moisture in the process of preparing the nanoparticle have been published. For example, "Lisi Xie, Daniel K. Harris, Moungi G. Bawendi, and Klays F. Jensen, Chem. Mater. 2015, 27, 14" describes, "the absorption wavelength of the quantum dot nanoparticle changes according to the content of moisture, and the absorption wavelength no longer changes when the moisture content is 0.05 mol/mol or more compared to the precursor" regarding the effect of moisture contained in a precursor used for preparing a core of the quantum dot nanoparticle. However, the document describes the effect of moisture contained in the precursor used in the preparation of the quantum dot nanoparticle, but does not propose a method of preparing a high quality quantum dot particle by controlling the effect of moisture. In addition, since it is difficult to keep the moisture contained in the precursor constant in actual mass production, the document does not seem to substantially suggest a solution to the problem caused by moisture.

U.S. Pat. No. 10,029,972 B2 describes a method of adding water to a precursor to be used to prepare a core of a quantum dot nanoparticle and preparing a precursor artificially including a hydroxyl group through hydrolysis, thereby keeping the particle size distribution of the core low. However, this method may sufficiently lower the effect of water on a cation precursor, but has the disadvantage that it is difficult to lower the effect of water on an anion precursor (for example, a precursor including P atom).

U.S. Pat. No. 9,570,549 B2 describes a method of increasing a luminous efficiency by artificially adding water to a quantum dot nanoparticle having a core-shell structure and bonding water molecules to the shell, thereby inducing a defect on the surface of the quantum dot nanoparticle. However, if water is bound to the quantum dot particle, the luminous efficiency is increased in the short term, but there is the problem that the quantum dot nanoparticle is easily oxidized and the persistence of luminous efficiency is lowered.

PRIOR ART DOCUMENTS

Patent Documents (Patent Literature 1) U.S. Pat. No. 10,029,972 B2
(Patent Literature 2) U.S. Pat. No. 9,570,549 B2

Non-Patent Document (Non-Patent Literature 1) Lisi Xie, Daniel K. Harris, Moungi G. Bawendi, and Klays F. Jensen, Chem. Mater. 2015, 27, 14.

DISCLOSURE

Technical Problem

The present invention has been devised to solve the problems of the prior art as described above, and it is an object of the present invention to provide a method of preparing a quantum dot nanoparticle having a narrow full width at half maximum and excellent quantum yield and color reproduction range by controlling the effect of moisture in the process of preparing a nanoparticle.

It is another object of the present invention to provide a quantum dot nanoparticle having a narrow full width at half maximum and excellent quantum yield and color reproduction range, prepared by the method, and a light emitting element comprising the quantum dot nanoparticle.

Technical Solution

In order to achieve the above object, the present invention provides a method of preparing a quantum dot nanoparticle, characterized in that the method comprises the step of reacting one or more cation precursors including one or more of Groups 12 and 13 elements with one or more anion precursors including one or more of Group 15 elements to prepare a quantum dot nanoparticle, wherein the reaction of the cation precursors and the anion precursors is carried out under the supply of a compound represented by following Chemical Formula 1:

$X_2O$           [Chemical Formula 1]

Wherein X is hydrogen or deuterium.

In addition, the present invention provides a method of preparing a quantum dot nanoparticle, characterized in that the method comprises the step of reacting one or more cation precursors including one or more of Groups 12 and 13 elements with one or more anion precursors including one or more of Group 15 elements to prepare a quantum dot nanoparticle, wherein the reaction of the cation precursors and the anion precursors is carried out under the supply of a mixture including a compound represented by following Chemical Formula 1 and a volatile polar solvent having a lower boiling point than the compound represented by Chemical Formula 1 in a volume ratio of 1:5 to 100, and wherein the mixture is supplied in a state where the internal temperature of a reactor is 200 to 300° C. so that the volatile polar solvent can be vaporized before contacting reactants in the reactor:

$X_2O$           [Chemical Formula 1]

Wherein X is hydrogen or deuterium.

In addition, the present invention provides a quantum dot nanoparticle which is prepared by the method of the present invention and in which the Peak-to-Valley (P) value of following Equation 1, calculated by the UV absorption wavelength, is 0.70 or less:

Peak-to-Valley $(P)=A/B$           [Equation 1]

Wherein A is the minimum absorbed amount of the valley portion in the UV absorption wavelength of the quantum dot nanoparticle; and B is the maximum absorbed amount of the peak portion in the UV absorption wavelength of the quantum dot nanoparticle.

In addition, the present invention provides a quantum dot nanoparticle having a core-shell structure, using the quantum dot nanoparticle of the present invention as a core and comprising a shell including one or more selected from zinc (Zn), sulfur (S), and selenium (Se).

In addition, the present invention provides a light emitting element comprising the quantum dot nanoparticle having a core-shell structure.

Advantageous Effects

The method of preparing the quantum dot particle of the present invention makes it possible to prepare a quantum dot nanoparticle having a narrow full width at half maximum and excellent quantum yield and color reproduction range by controlling the effect of moisture in the process of preparing a nanoparticle.

In addition, the quantum dot nanoparticle of the present invention and a quantum dot nanoparticle having a core-shell structure comprising the quantum dot nanoparticle provide characteristics of a narrow full width at half maximum, an excellent quantum yield, and an excellent color reproduction range.

BEST MODE

Figure 1:
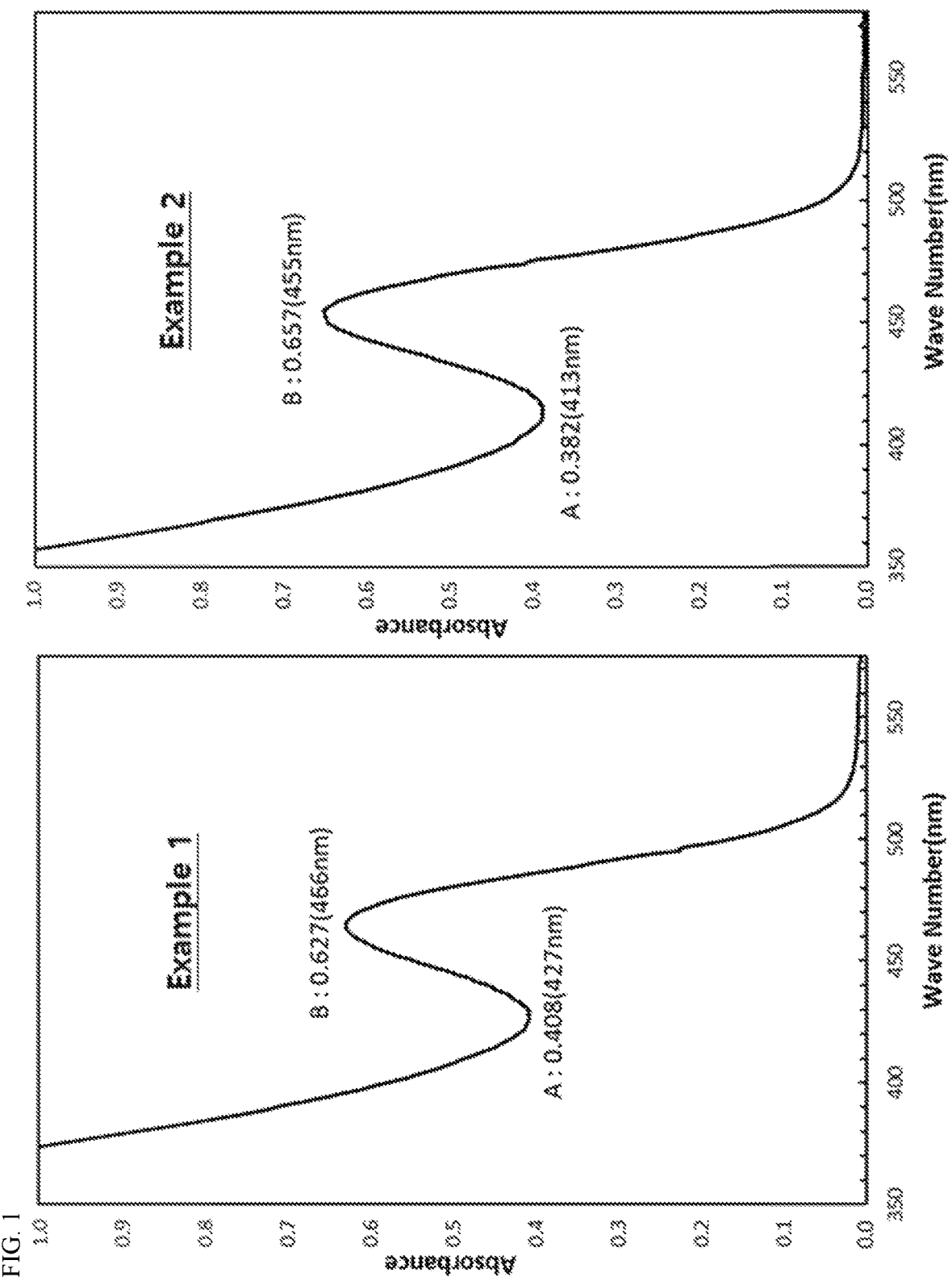
FIGS. 1 to 3 show absorption spectra of quantum dot nanoparticles dispersed in toluene, prepared in Examples 1 to 4 of the present invention and Comparative Examples 1 and 2.

Hereinafter, preferred examples of the present invention will be described in detail with reference to the accompanying drawings. Prior to describing the present invention, if it is determined that the specific description of the related known functions and constitutions may unnecessarily obscure the gist of the present invention, the description thereof will be omitted.

The following description and drawings will illustrate certain examples so that those skilled in the art can easily implement the apparatus and methods to be described. Other examples may include structurally and logically different modifications. Individual components and functions may generally be selected unless explicitly required, and the order of the processes may be changed. Portions and features of some examples may be included in or substituted with other examples.

The present invention relates to a method of preparing a quantum dot nanoparticle capable of easily controlling the particle size to a size suitable for the desired emission wavelength band by effectively inputting water molecules to partially interfere with the growth of the quantum dot nanoparticle, thereby suppressing the rapid increase in particle size.

According to the preparation method of the present invention, it is possible to prepare a quantum dot nanoparticle having a narrow full width at half maximum by narrowing the particle size distribution. If the cation precursor and the anion precursor meet with water molecules during the process of preparing the quantum dot nanoparticle, the following reaction is generated.

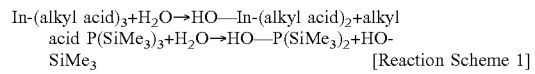
[Reaction Scheme 1]

As shown in Reaction Scheme 1 above, the cation precursor and the anion precursor including a hydroxyl group (—OH) have a lower particle growth rate due to a decrease in the bonding group, and accordingly, the particle size distribution is also uniformly formed. However, a method of simply inputting only water has the disadvantage that it is difficult to introduce a hydroxyl groups (—OH) into the quantum dot nanoparticle.

Therefore, the preparation method of the present invention provides a method of effectively inputting water molecules into the process of generating the quantum dot nanoparticle.

The present invention relates to a method of preparing a quantum dot nanoparticle, characterized in that the method comprises the step of reacting one or more cation precursors including one or more of Groups 12 and 13 elements with one or more anion precursors including one or more of Group 15 elements to prepare a quantum dot nanoparticle, wherein the reaction of the cation precursors and the anion precursors is carried out under the supply of a compound represented by following Chemical Formula 1:

$X_2O$ [Chemical Formula 1]

Wherein X is hydrogen or deuterium.

The compound represented by Chemical Formula 1 is more preferably supplied as a mixture (or a solution) including a compound represented by Chemical Formula 1 and a volatile polar solvent having a lower boiling point than the compound represented by Chemical Formula 1. The volatile polar solvent vaporizes faster than the compound of Chemical Formula 1 and diffuses water or heavy water, which is the compound of Chemical Formula 1, so that the hydroxyl group (—OH) is effectively introduced into the quantum dot nanoparticle. As described above, the hydroxyl group lowers the growth rate of the quantum dot nanoparticle and makes the particle size distribution uniform.

The mixture may include the compound represented by Chemical Formula 1 and the volatile polar solvent in a volume ratio of 1:5 to 100, more preferably 1:5 to 20. In the above, if the volatile polar solvent is included in a volume ratio of less than 5, it is not preferable in that diffusion is lowered and contact with the reactant becomes impossible, and if it is included in a volume ratio of more than 100, it is not preferable in that the number of hydroxyl groups (—OH) decreases and the contact point with the reactant decreases.

When X is deuterium in Chemical Formula 1 above, it is more preferable because heavy water proceeds the hydrolysis reaction more effectively.

The compound represented by Chemical Formula 1 (or a mixture including the same) may be supplied so that the molar ratio of the compound represented by Chemical Formula 1 is 0.001 to 0.10 mole, more preferably may be supplied in 0.001 to 0.05 mole, based on 1 mole of the total number of moles of the cation precursors and the anion precursors. If the compound of Chemical Formula 1 is supplied below the above-mentioned range, it is not preferable in that diffusion is not sufficiently performed and the function of particle size and dispersion is not exerted, and if it is supplied above the above-mentioned range, it is not preferable in that oxidation of the quantum dot to be prepared is induced and stability of the quantum dot is lowered.

In the preparation method of the present invention, the reaction may be carried out at 100 to 400° C., preferably 150 to 350° C., and more preferably 200 to 300° C. If the reaction proceeds in the above-mentioned temperature range, it is preferable because water or heavy water molecules may be brought into uniform contact with the reactants by diffusion.

The mixture is preferably supplied in a condition that the volatile polar solvent having a lower boiling point than the compound of Chemical Formula 1 (water or heavy water) can be vaporized before contacting the reactants in the reactor. Such conditions may include setting the internal temperature of the reactor to 100 to 400° C. and supplying the mixture, and more preferably setting the internal temperature of the reactor to 200 to 300° C. and supplying the mixture slowly.

If the volatile polar solvent having a low boiling point is vaporized in the reactor as described above, it is preferable because water or heavy water is more effectively diffused and uniformly contacts the reactants.

The mixture is preferably input slowly for 0.5 to 5.0 minutes so that the volatile polar solvent is sufficiently vaporized. However, the input rate of the mixture may vary depending on the total preparation amount.

It is preferable that the Peak-to-Valley (P) value of Equation 1 below, calculated by the UV absorption wavelength of the quantum dot nanoparticle prepared by the preparation method of the present invention, is 0.70 or less. If the Peak-to-Valley (P) value is more than 0.70, it is not preferable in that since the size distribution of the quantum dot nanoparticles becomes large, the quantum yield is lowered and the full width at half maximum is large when preparing the quantum dot nanoparticles having a core-shell structure. The Peak-to-Valley (P) value may be 0.1 to 0.7, more preferably may be 0.1 to 0.65.

Peak-to-Valley $(P)=A/B$ [Equation 1]

Wherein A is the minimum absorbed amount of the valley portion in the UV absorption wavelength of the quantum dot nanoparticle; and B is the maximum absorbed amount of the peak portion in the UV absorption wavelength of the quantum dot nanoparticle.

In one embodiment of the present invention, the anion precursors are preferably input by 2 to 10 divisions, preferably 2 to 6 divisions, and more preferably 3 to 5 divisions during the reaction. If the anion precursors are input by division as described above, it is preferable in that the size may be uniformly limited and grown.

In one embodiment of the present invention, the cation precursors are preferably input by 2 to 4 divisions during the reaction. If the cation precursors are input by division as described above, it is preferable in that the size may be uniformly limited and grown.

If the anion precursors and the cation precursors are input by division as described above, the compound represented by Chemical Formula 1 or the mixture including the same may also be input by division. This input by division is necessary to efficiently supply the compound represented by the Chemical Formula 1 or the mixture including the same to the reaction of the anion precursors and the cation precursors to be input by division.

In one embodiment of the present invention, the compound represented by Chemical Formula 1 or the mixture including the same is preferably input by a method of injecting with a syringe, but is not limited thereto.

In one embodiment of the present invention, as the volatile polar solvent having a lower boiling point than the compound of Chemical Formula 1 included in the mixture, for example, one or more selected from the group consisting of acetone, methyl ethyl ketone, methyl acetate, methanol, ethanol, isopropyl alcohol, n-propyl alcohol, and the like may be used.

In one embodiment of the present invention, one or more elements of indium (In) and zinc (Zn) may be preferably used as one or more of Groups 12 and 13 elements above, and phosphorus (P) may be preferably used as Group 15 elements above.

In one embodiment of the present invention, the cation precursors may include a C6 to C20 higher fatty acid ligand. The higher fatty acid ligand may be one or more selected from the group consisting of lauric acid, mystric acid, palmitic acid, stearic acid, oleic acid, and the like.

The specific form of the higher fatty acid ligand may include, for example, a form in which the higher fatty acid exemplified above is coordinated to a cationic atom in the form of an anion.

In one embodiment of the present invention, as the cation precursors, those obtained by carrying out ligand exchange with C6 to C20 higher fatty acid for one or more cation precursors selected from the group consisting of indium chloride, indium oxide, indium nitrate, indium sulfate, indium acetate, Indium carboxylate, zinc acetate, dimethylzinc, diethylzinc, zinc carboxylate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, zinc oleate, and the like may be preferably used. The ligand exchange may be accomplished by methods known in the art.

In particular, as the cation precursors, those obtained by carrying out ligand exchange with C6 to C20 higher fatty acid for one or more cation precursors selected from indium acetate and zinc acetate may be preferably used.

In one embodiment of the present invention, as the anion precursors, for example, one including a compound represented by following Chemical Formula 2 may be used:

$$PHn(Si(CH_3)_3)_{3-n} \qquad \text{[Chemical Formula 2]}$$

Wherein n is an integer of 0 to 2.

As the compound of Chemical Formula 2, tris(trimethylsilyl)phosphine may be preferably used.

In one embodiment of the present invention, the anion precursors may be input by diluting the compound of Chemical Formula 2 with 5 to 15 times weight of a trialkyl phosphine compound having 10 to 25 carbon atoms. The anion precursors in the form as described above are preferred in terms of stabilization and protection of quantum dots.

The anion precursors may be input by 2 to 10 divisions during the reaction, and may be input at a temperature of 150 to 300° C., and more preferably 200 to 300° C. If the anion precursors are input in the above-described temperature range, it is preferable in that the growth of quantum dots may be controlled.

In one embodiment of the present invention, 0.25 to 2 moles of the anion precursors may be reacted based on 1 mole of the total cation precursors.

The method of preparing the quantum dot nanoparticle of the present invention may be carried out by methods known in the art except for the contents described above.

In one embodiment of the present invention, the present invention relates to a method of preparing a quantum dot nanoparticle, characterized in that the method comprises the step of reacting one or more cation precursors including one or more of Groups 12 and 13 elements with one or more anion precursors including one or more of Group 15 elements to prepare a quantum dot nanoparticle, wherein the reaction of the cation precursors and the anion precursors is carried out under the supply of a mixture (or a solution) including a compound represented by following Chemical Formula 1 and a volatile polar solvent having a lower boiling point than the compound represented by Chemical Formula 1 in a volume ratio of 1:5 to 100, and wherein the mixture is supplied in a state where the internal temperature of a reactor is 200 to 300° C. so that the volatile polar solvent having a lower boiling point than the compound represented by Chemical Formula 1 can be vaporized before contacting reactants in the reactor:

$$X_2O \qquad \text{[Chemical Formula 1]}$$

Wherein X is hydrogen or deuterium.

With regard to the above preparation method, the individual contents described above may be applied to the above constitutions as they are. Therefore, redundant contents will be omitted.

The anion precursors may be input by 2 to 10 divisions during the reaction, and the cation precursors may be input by 2 to 4 divisions during the reaction.

In one embodiment of the present invention, the Peak-to-Valley (P) value of Equation 1 below, calculated by the UV absorption wavelength of the quantum dot nanoparticle prepared by the preparation method, may be 0.70 or less.

The Peak-to-Valley (P) value may be 0.1 to 0.7, more preferably may be 0.1 to 0.65.

$$\text{Peak-to-Valley } (P) = A/B \qquad \text{[Equation 1]}$$

Wherein A is the minimum absorbed amount of the valley portion in the UV absorption wavelength of the quantum dot nanoparticle; and B is the maximum absorbed amount of the peak portion in the UV absorption wavelength of the quantum dot nanoparticle.

The mixture may be supplied so that the molar ratio of the compound represented by Chemical Formula 1 included in the mixture is 0.001 to 0.1 mole based on 1 mole of the total number of moles of the cation precursors and the anion precursors.

In addition, the present invention relates to a method of preparing a quantum dot nanoparticle having a core-shell structure, comprising the step of using the quantum dot nanoparticle prepared by the preparation method of the present invention as a core and reacting one or more cationic shell precursors including one or more of Group 12 elements with one or more anionic shell precursors including one or more of Group 16 elements, together with the core.

Group 12 elements above may be, for example, zinc (Zn), and Group 16 elements above may be one or more selected from sulfur (S) and selenium (Se).

The one or more cationic shell precursors including Group elements above may be selected from zinc oleate, zinc palmitate, zinc myristate, zinc laurate, and the like.

As the one or more anionic shell precursors including one or more of Group 16 elements above, those prepared by diluting one or more selected from sulfur (S), selenium (Se), and the like, with a trialkyl phosphine compound having 10 to 25 carbon atoms to 1 to 4 normal concentrations may be used.

In one embodiment of the present invention, according to the method for preparing the quantum dot nanoparticle having a core-shell structure, the ligand may be introduced on the surface of the shell by further carrying out the ligand exchange reaction using a ligand compound selected from the group consisting of mercaptan group, amine group, phosphine group, carboxyl group, and the like.

In addition, the present invention relates to a quantum dot nanoparticle which is prepared by the present invention and in which the Peak-to-Valley (P) value of Equation 1 below, calculated as the UV absorption wavelength, is 0.70 or less.

The Peak-to-Valley (P) value may be 0.1 to 0.7, more preferably may be 0.1 to 0.65.

$$\text{Peak-to-Valley } (P) = A/B \qquad \text{[Equation 1]}$$

Wherein A is the minimum absorbed amount of the valley portion in the UV absorption wavelength of the quantum dot nanoparticle; and B is the maximum absorbed amount of the peak portion in the UV absorption wavelength of the quantum dot nanoparticle.

The quantum dot nanoparticle may be preferably used as the core of the quantum dot particle, but the use of the quantum dot nanoparticle is not limited thereto.

The quantum dot nanoparticle may include indium (In) and phosphorus (P), and the peak portion showing the maximum absorbed amount in the UV absorption spectrum may have a wavelength of 550 to 590 nm.

In addition, it may include indium (In), zinc (Zn), and phosphorus (P), and the peak portion showing the maximum absorbed amount in the UV absorption spectrum may have a wavelength of 440 to 480 nm.

In addition, the present invention relates to a quantum dot nanoparticle having a core-shell structure using the quantum dot nanoparticle of the present invention as a core and comprising a shell including one or more selected from zinc (Zn), sulfur (S), and selenium (Se).

The quantum dot nanoparticle having a core-shell structure may be a green emitting quantum dot nanoparticle having a core-shell structure, including indium (In), zinc (Zn), and phosphorus (P), including a quantum dot nanoparticle core in which the peak portion showing the maximum absorbed amount in the UV absorption spectrum has a wavelength of 440 to 480 nm, and having the maximum emission wavelength of 510 to 540 nm, a full width at half maximum of 40 nm or less, and a quantum yield of 75% or more.

In the above, the quantum dot nanoparticle may be a green emitting quantum dot nanoparticle having a core-shell structure, having a full width at half maximum of 37 nm or less and a quantum yield of 80% or more.

In addition, the quantum dot nanoparticle having a core-shell structure may be a red emitting quantum dot nanoparticle having a core-shell structure, including indium (In) and phosphorus (P), including a quantum dot nanoparticle core in which the peak portion showing the maximum absorbed amount in the UV absorption spectrum has a wavelength of 550 to 590 nm, and having the maximum emission wavelength of 610 to 640 nm, a full width at half maximum of 40 nm or less, and a quantum yield of 75% or more.

In the above, the quantum dot nanoparticle may be a red emitting quantum dot nanoparticle having a core-shell structure, having a full width at half maximum of 39 nm or less and a quantum yield of 70% or more.

The method of preparing the quantum dot nanoparticle having a core-shell structure of the present invention may be carried out by methods known in the art except for the contents described above.

The quantum dot nanoparticle prepared by the present invention or the quantum dot nanoparticle having a core-shell structure may be preferably used as a quantum dot.

In addition, the present invention relates to a light emitting element comprising the quantum dot nanoparticle having a core-shell structure. The light emitting element may be constituted by techniques and components known in the art, except for features comprising the quantum dot nanoparticle having a core-shell structure of the present invention.

Hereinafter, the present invention will be described in more detail.

[Quantum Dot]

Conventionally, the optical properties of the quantum dot may vary depending on its size, and the quantum dot may be substantially homogeneous in terms of material properties, or in certain embodiments, may also be heterogeneous. The optical properties of the quantum dot may be determined by controlling a nanocrystal size by its particle size, chemistry, or surface composition. That is, the range of photoelectron emission in the entire optical spectrum may be determined by mechanisms as described above. In the quantum dot having the core-shell structure, the band gap of the semiconductor nanocrystal in the shell may be larger than that of the semiconductor nanocrystal in the core, but is not limited thereto. The energy band gap of the semiconductor nanocrystal in the shell may be smaller than that of the semiconductor nanocrystal in the core. In the case of a multilayer shell, the outermost layer may have a larger energy band gap than the semiconductor nanocrystals in the core and other layers of the shell.

In the multilayer shell, the band gap of the semiconductor nanocrystal of each layer may be appropriately selected to efficiently exhibit the quantum confinement effects. The semiconductor nanocrystal particle may have a particle diameter (diameter calculated from the two-dimensional area of the electron micrograph of the particle, if not spherical) of about 1 nm to about 100 nm. The quantum dot may have a particle diameter of 1 nm to 50 nm, preferably 2 nm to 35 nm, and even more preferably 5 nm to 15 nm. The size of the quantum dot may be 1 nm or more, 2 nm or more, 3 nm or more, 4 nm or more, or 5 nm or more. The size of the quantum dot may be 50 nm or less, 40 nm or less, 30 nm or less, 25 nm or less, 20 nm or less, 19 nm or less, 18 nm or less, 17 nm or less, 16 nm or less, or 15 nm or less. The shape of the semiconductor nanocrystal particle is not specially limited, and may be, for example, spherical, pyramidal, multi-arm, cubic, nanotubes, nanowires, nanofibers, nanosheets, or a combination thereof, but is not limited thereto.

[Ligand Exchange of Quantum Dot Particle]

Hereinafter, the ligand exchange of a quantum dot will be described as an example.

The synthesized quantum dot may be recovered by centrifugation on an excess non-solvent in the reaction solution containing the same. The non-solvent may be determined according to the polarity of a ligand. In the case where a terminal group of the ligand is hydroxy group or carboxyl group, a non-polar solvent having a dielectric constant of 15 or less may be used, but the kind is not limited, and it is preferable to use toluene, benzene, xylene, hexane, heptane, and the like, having a boiling point of 130° C. or less for easy drying of the solvent later.

The quantum dot particle is optionally mixed and dispersed with a matrix (for example, an organic polymer, silicon-containing polymer, inorganic, glassy, and/or other matrix) or an organic solvent. The thus mixed quantum dot particle may be applied to, for example, an LED light emitting element, a backlight unit, a downlight, a color filter resist or other display or lighting unit, or an optical filter. The matrices and elements illustrated above are known in the art. The introduction of the ligand may be accomplished by the usual process of mixing and reacting a ligand to be exchanged with a quantum dot solution.

Hereinafter, the present invention will be described in more detail through examples and the like, but the scope and contents of the present invention may not be interpreted to be reduced or limited by the following examples and the like. In addition, based on the disclosure of the present invention including the following examples, it is apparent that those skilled in the art may easily implement the present invention in which experimental results are not specifically presented, and it is also obvious that such changes and modifications fall within the scope of the appended claims.

Preparative Example 1: Preparation of Indium Precursor 51.0 g (0.175 mol) of indium acetate, 134.5 g (0.525 mol) of palmitic acid, and 152.2 g of 1-octadecene were input in a 4-neck 1 L glass reactor equipped with a heating mantle, reduced pressure vacuum device, thermometer, and mechanical stirrer, and the temperature was elevated to 100° C. while inputting nitrogen. After elevating the temperature, it was confirmed that the solid compound was completely dissolved in the reactor, and acetic acid produced during the reaction was completely removed while elevating the temperature to 170° C. and maintaining a reduced pressure vacuum at 10 mTorr for 3 hours. Thereafter, 305.4 g of indium palmitate precursor was cooled to room temperature and stored in a nitrogen-filled container.

Preparative Example 2: Preparation of Zinc (Zn) Precursor 64.2 g (0.35 mol) of zinc acetate, 197.7 g (0.70 mol) of oleic acid, and 373.1 g of 1-octadecene were input in a 4-neck 1 L glass reactor equipped with a heating mantle, reduced pressure vacuum device, thermometer, and mechanical stirrer, and the temperature was elevated to 100° C. while inputting nitrogen. After elevating the temperature, it was confirmed that the solid compound was completely dissolved in the reactor, and acetic acid produced during the reaction was completely removed while elevating the temperature to 170° C. and maintaining a reduced pressure vacuum at 10 mTorr for 3 hours. Thereafter, 592.1 g of zinc oleate precursor was cooled to room temperature and stored in a nitrogen-filled container.

Preparative Example 3: Preparation of Phosphorus (P) Precursor

A phosphorus precursor was prepared by mixing 50 g of tris(trimethylsilyl)phosphine (97%) and 350 g of trioctyl phosphine in a glove box filled with argon (Ar) gas.

Example 1: Preparation of Quantum Dot Nanoparticle 13.7 g of indium palmitate precursor prepared in Preparative Example 1, 9.7 g of zinc oleate precursor prepared in Preparative Example 2, and 35.1 g of 1-octadecene were input in a 4-neck 1 L glass reactor equipped with a heating mantle, reduced pressure vacuum device, thermometer, and mechanical stirrer, and the temperature was elevated to 130° C., and then, moisture and trace acetic acid therein were completely removed by maintaining a reduced pressure vacuum at 10 mTorr for 3 hours. The pressure was released, and then all conditions were carried out while introducing argon (Ar) gas. The temperature was elevated to 170° C., and 15.6 g of a phosphorus (P) precursor mixture prepared in Preparative Example 3 was rapidly input at 170° C. The temperature was elevated to 250° C., and 1 mL of water/acetone (1/10, v/v) was slowly input. After the input was completed, the temperature was elevated again to 280° C., 16.7 g of the phosphorus (P) precursor mixture prepared in Preparative Example 3 was rapidly input, and the reaction was carried out for additional 1 hour.

The temperature was cooled to room temperature, 400 g of acetone was input, and centrifugation (4500 rpm/15 min) was carried out to obtain a solid particle, and then 1.6 kg of toluene was input thereinto to obtain a quantum dot nanoparticle core dispersed in toluene. The absorption wavelength of the quantum dot nanoparticle core dispersed in toluene was obtained through UV spectroscopy.

26.7 g of the quantum dot nanoparticle core dispersed in toluene, 20.8 g of the zinc oleate precursor prepared in Preparative Example 2, and 36.3 g of trioctylamine were input into the reactor, and the temperature was elevated to 190° C. while inputting argon (Ar) gas. 0.5 g of 2N sulfur/trioctylphosphine solution (hereinafter referred to as TOPS) was input, the reaction was carried out for 20 minutes, and the temperature was elevated to 290° C. 1.6 g of 2N selenium/trioctylphosphine solution (hereinafter referred to as TOPSe) was input and the temperature was elevated to 320° C. 20.8 g of the zinc oleate precursor prepared in Preparative Example 2, 0.7 g of TOPS, and 1.6 g of TOPSe were input at 320° C., and the reaction was carried out for 1 hour. The reaction temperature was lowered to 280° C., 2.1 g of TOPS was input, and the reaction was carried out for 1 hour, and then, the temperature was cooled to room temperature to terminate the reaction.

250 g of ethanol was input into the reactant and centrifugation (4500 rpm/15 min) was carried out to obtain a solid particle, and then the solid particle was dried, and 500 g of toluene was input thereinto to obtain a green emitting quantum dot nanoparticle having a core-shell structure dispersed in toluene, and a full width at half maximum, a maximum emission wavelength, and a quantum yield of the quantum dot nanoparticle having a core-shell structure dispersed in toluene were measured through quantum dot nanoparticle photoluminescence (PL) analysis.

Example 2: Preparation of Quantum Dot Nanoparticle

A green emitting quantum dot nanoparticle having a core-shell structure was prepared in the same manner as in Example 1, except that 1 mL of heavy water/ethanol (1/10, v/v) was used instead of 1 mL of water/acetone (1/10, v/v) used in Example 1 above.

Example 3: Preparation of Quantum Dot Nanoparticle 27.5 g of indium palmitate precursor prepared in Preparative Example 1 and 35.1 g of 1-octadecene were input in a 4-neck 1 L glass reactor equipped with a heating mantle, reduced pressure vacuum device, thermometer, and mechanical stirrer, and the temperature was elevated to 130° C., and then, moisture and trace acetic acid therein were completely removed by maintaining a reduced pressure vacuum at 10 mTorr for 3 hours. The pressure was released, and then all conditions were carried out while introducing argon (Ar) gas. The temperature was elevated to 170° C., and 15.6 g of a phosphorus (P) precursor mixture prepared in Preparative Example 3 was rapidly input at 170° C. The temperature was elevated to 250° C., and 1 mL of water/ethanol (1/10, v/v) was slowly input. 1 minute after the input was completed, 19.6 g of the indium palmitate precursor prepared in Preparative Example 1 was input. The temperature was elevated again to 280° C., and 16.7 g of the phosphorus (P) precursor mixture prepared in Preparative Example 3 was rapidly input. 5 minutes after the input was completed, 1 mL of water/ethanol (1/10, v/v) was slowly input. Thereafter, the temperature was cooled to 240° C., and 15.7 g of the phosphorus (P) precursor mixture prepared in Preparative Example 3 was input, and the reaction was carried out at 240° C. for 1 hour.

The temperature was cooled to room temperature, 400 g of acetone was input, and centrifugation (4500 prm/15 min) was carried out to obtain a solid particle, and then 1.6 kg of toluene was input thereinto to obtain a quantum dot nanoparticle core dispersed in toluene. The absorption wavelength of the quantum dot nanoparticle core dispersed in the toluene was obtained through UV spectroscopy.

26.7 g of the quantum dot nanoparticle core dispersed in the toluene, 20.8 g of the zinc oleate precursor prepared in Preparative Example 2, and 36.3 g of trioctylamine were input into the reactor, and the temperature was elevated to 190° C. while inputting argon (Ar) gas. 0.5 g of 2N sulfur/trioctylphosphine solution (hereinafter referred to as TOPS) was input, the reaction was carried out for 20 minutes, and the temperature was elevated to 290° C. 1.6 g of 2N selenium/trioctylphosphine solution (hereinafter referred to as TOPSe) was input and the temperature was elevated to 320° C. 20.8 g of the zinc oleate precursor prepared in Preparative Example 2, 0.7 g of TOPS, and 1.6 g of TOPSe were input at 320° C., and the reaction was carried out for 1 hour. The reaction temperature was lowered to 280° C., 2.1 g of TOPS was input, and the reaction was carried out for 1 hour, and then, the temperature was cooled to room temperature to terminate the reaction.

250 g of ethanol was input into the reactant and centrifugation (4500 rpm/15 min) was carried out to obtain a solid particle, and then the solid particle was dried, and 500 g of toluene was input thereinto to obtain a quantum dot nanoparticle having a core-shell structure dispersed in toluene. A full width at half maximum, a maximum emission wavelength, and a quantum yield of the red emitting quantum dot nanoparticle having a core-shell structure dispersed in toluene were measured through quantum dot nanoparticle photoluminescence (PL) analysis.

Example 4: Preparation of Quantum Dot Nanoparticle

A red emitting quantum dot nanoparticle having a core-shell structure was prepared in the same manner as in Example 3, except that 1 mL of heavy water/acetone (1/5, v/v) was used instead of 1 mL of water/ethanol (1/10, v/v) used in Example 3 above.

Comparative Examples 1: Preparation of Quantum Dot Nanoparticle

A green emitting quantum dot nanoparticle having a core-shell structure was prepared in the same manner as in Example 1, except that 1 mL of water/acetone (1/10, v/v) used in Example 1 above was not input, and 32.3 g of the phosphorus (P) precursor prepared in Preparative Example 3 was input only once at 280° C.

Comparative Examples 2: Preparation of Quantum Dot Nanoparticle

A red emitting quantum dot nanoparticle having a core-shell structure was prepared in the same manner as in Example 3, except that only 0.1 mL of water was input at room temperature instead of 1 mL of water/ethanol (1/10, v/v) used in Example 3 above.

Test Example: Evaluation of Physical Properties of Quantum Dot Nanoparticle

1) Evaluation Method
(1) Analysis of Quantum Dot Nanoparticle Core
Cores of the quantum dot nanoparticles dispersed in toluene prepared in Examples 1 to 4 and Comparative Examples 1 and 2 (the concentration of the prepared quantum dot nanoparticle cores may be different) were put into a quartz cell having an inner thickness of 1 cm, and the absorption spectrum was measured using UV-2450 supplied by Shimadzu Corporation.

The following information was obtained using the absorption spectrum:

Peak to Valley (P)

The minimum absorbance of the valley portion in the absorption spectrum is defined as A, the maximum absorbance of the peak portion is defined as B, and the value obtained by dividing A by B is defined as Peak to Valley (P). It may be determined that the lower the Peak to Valley (P) value, the better the quality of the quantum dot nanoparticle core.

(2) Maximum Absorption Wavelength

The wavelength showing the second inflection point in the absorption spectrum is defined as the maximum absorption wavelength (nm). It may be determined that the lower the maximum absorption wavelength, the smaller the particle size.

Figure 2:
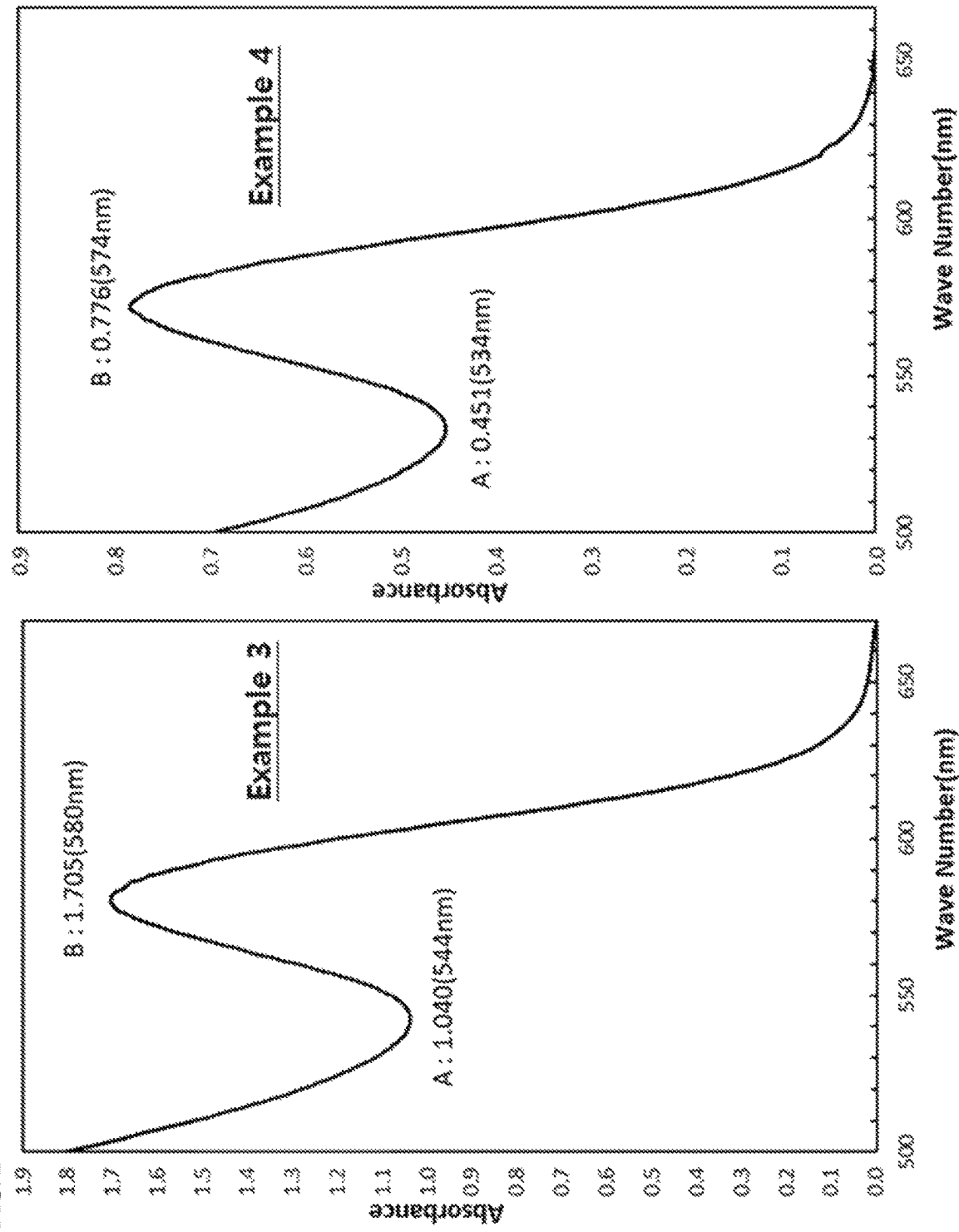
Figure 3:
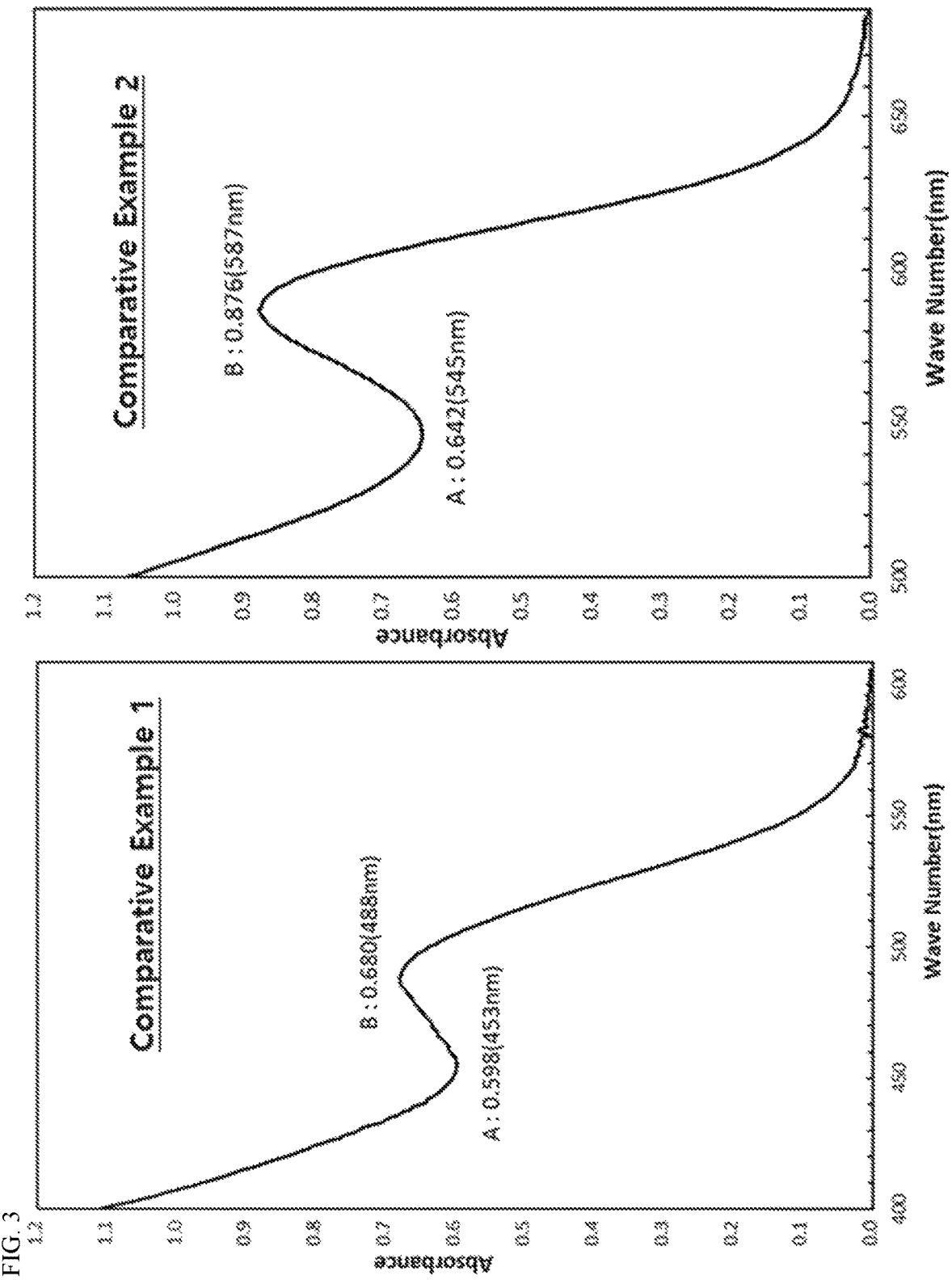

The absorption spectra for cores of quantum dot nanoparticles dispersed in toluene, prepared in Examples 1 to 4 and Comparative Examples 1 and 2 above are shown in FIGS. 1 to 3.

(3) Analysis of Quantum Dot Nanoparticle Having Core-Shell Structure

Photoluminescense (PL) spectra were obtained for quantum dot nanoparticles having a core-shell structure dispersed in toluene, prepared in Examples 1 to 4 and Comparative Examples 1 and 2, using QUANTAURUS-QY™ (C11347-11) supplied by Hamamatsu Photonics K.K.

Maximum Emission Wavelength (nm)

Wavelength showing the maximum absorbance in the photoluminescense (PL) spectrum.

Full Width at Half Maximum (nm)

Difference between two points having an absorbance of half of the maximum value of the absorbance in the photoluminescense (PL) spectrum.

The lower the full width at half maximum, the narrower the particle size distribution, and the higher the color reproduction range.

Figure 4:
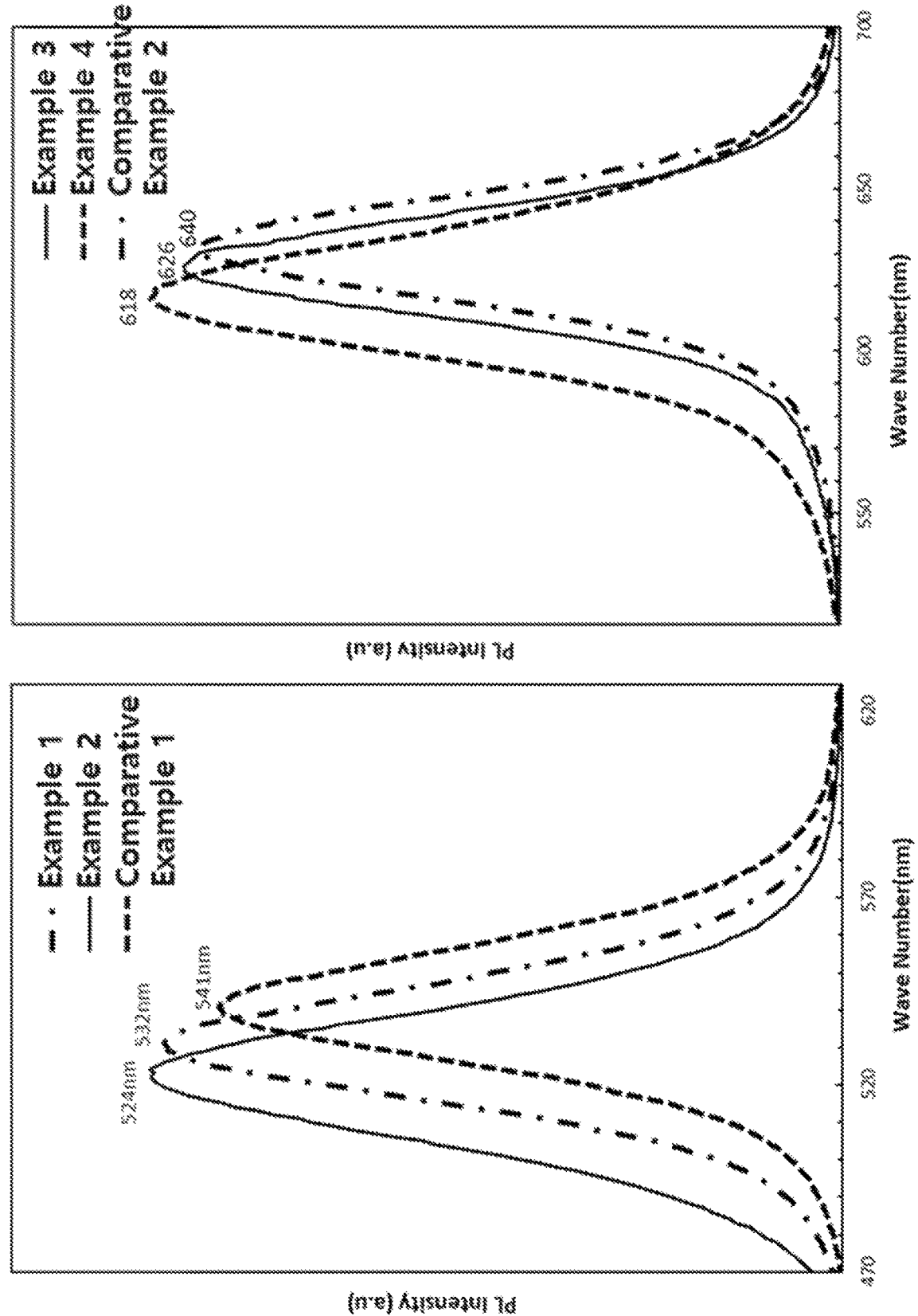
FIG. 4 shows PL spectra of quantum dot nanoparticles having core-shell structures dispersed in toluene, prepared in Examples 1 to 4 of the present invention and Comparative Examples 1 and 2.

PL spectra of quantum dot nanoparticles having core-shell structures dispersed in toluene, prepared in Examples 1 to 4 and Comparative Examples 1 and 2 above are shown in FIG. 4.

Quantum Yield (%)

The relative quantum yield was calculated and displayed using the photoluminescense (PL) spectrum with reference to "William et al., Relative fluorescence quantum yields using a computer-controlled luminescence spectrometer, Analyst, 108: 1067-1071." It may be evaluated that the higher the quantum yield, the better the quality of the quantum dot nanoparticle.

2) Evaluation Results

TABLE 1

| | | Example 1 | Example 2 | Example 3 | Example 4 | Comparative Example 1 | Comparative Example 2 |
|---|---|---|---|---|---|---|---|
| Core | A | 0.408 | 0.382 | 1.040 | 0.451 | 0.598 | 0.642 |
| | B | 0.627 | 0.657 | 1.705 | 0.776 | 0.68 | 0.876 |
| | Peak to Valley (P) | 0.65 | 0.58 | 0.61 | 0.58 | 0.88 | 0.73 |
| | Maximum absorption wavelength (nm) | 466 | 455 | 580 | 578 | 488 | 587 |
| Core-Shell | Luminous color | green | green | red | red | green | red |
| | Maximum emission wavelength (nm) | 532 | 524 | 626 | 618 | 541 | 640 |
| | Full width at half maximum (nm) | 40 | 37 | 39 | 37 | 45 | 43 |
| | Quantum yield (%) | 78 | 80 | 79 | 80 | 67 | 71 |

As shown in Table 1 above, it was confirmed that the quantum dot nanoparticles prepared according to the Examples of the present invention exhibit a lower Peak to Valley (P) value compared to the quantum dot nanoparticles of the Comparative Examples, thereby having better quality.

In addition, it was confirmed that the quantum dot nanoparticles prepared according to the Examples of the present invention exhibit much better results in the full width at half maximum and quantum yield compared to the quantum dot nanoparticles of the Comparative Examples, thereby having better quality.

Although the present invention has been described in connection with the preferred examples mentioned above, it is possible to make various changes or modifications without departing from the gist and scope of the invention. Accordingly, the appended claims will include such changes or modifications as long as they fall within the gist of the present invention.

The invention claimed is:

1. A method of preparing a quantum dot nanoparticle, characterized in that the method comprises the step of reacting one or more cation precursors including one or more of Groups 12 and 13 elements with one or more anion precursors including one or more of Group 15 elements to prepare a quantum dot nanoparticle,
wherein the reaction of the cation precursors and the anion precursors is carried out under the supply of a mixture including a compound represented by following Chemical Formula 1 and a volatile polar solvent having a lower boiling point than the compound represented by Chemical Formula 1:

$$X_2O \qquad \text{Chemical Formula 1}$$

Wherein X is hydrogen or deuterium.

2. The method of preparing a quantum dot nanoparticle according to claim 1, characterized in that the compound represented by Chemical Formula 1 and the volatile polar solvent are included in a volume ratio of 1:5 to 100.

3. The method of preparing a quantum dot nanoparticle according to claim 1, characterized in that the compound represented by Chemical Formula 1 is supplied to be 0.001 to 0.1 mole, based on 1 mole of the total number of moles of the cation precursors and the anion precursors.

4. The method of preparing a quantum dot nanoparticle according to claim 1, characterized in that the reaction is carried out at 100 to 400° C.

5. The method of preparing a quantum dot nanoparticle according to claim 1, characterized in that the mixture including the compound represented by Chemical Formula 1 and the volatile polar solvent having a lower boiling point than the compound represented by Chemical Formula 1 is supplied in a condition that the volatile polar solvent can be vaporized before contacting the reactants in a reactor.

6. The method of preparing a quantum dot nanoparticle according to claim 1, characterized in that the Peak-to-Valley (P) value of following Equation 1, calculated by the UV absorption wavelength of the prepared quantum dot nanoparticle, is 0.70 or less:

$$\text{Peak-to-Valley } (P) = A/B \qquad \text{Equation 1}$$

Wherein A is the minimum absorbed amount of the valley portion in the UV absorption wavelength of the quantum dot nanoparticle; and B is the maximum absorbed amount of the peak portion in the UV absorption wavelength of the quantum dot nanoparticle.

7. The method of preparing a quantum dot nanoparticle according to claim 1, characterized in that the volatile polar solvent having a lower boiling point than the compound represented by Chemical Formula 1 is one or more selected from the group consisting of acetone, methyl ethyl ketone, methyl acetate, methanol, ethanol, isopropyl alcohol, and n-propyl alcohol.

8. The method of preparing a quantum dot nanoparticle according to claim 1, characterized in that the one or more of Groups 12 and 13 elements are one or more elements of indium (In) and zinc (Zn), and Group 15 elements are phosphorus (P).

9. The method of preparing a quantum dot nanoparticle according to claim 1, characterized in that 0.25 to 2 moles of the anion precursors are reacted based on 1 mole of the total cation precursors.

10. A method of preparing a quantum dot nanoparticle, characterized in that the method comprises the step of reacting one or more cation precursors including one or more of Groups 12 and 13 elements with one or more anion precursors including one or more of Group 15 elements to prepare a quantum dot nanoparticle,
wherein the reaction of the cation precursors and the anion precursors is carried out under the supply of a mixture including a compound represented by following Chemical Formula 1 and a volatile polar solvent having a lower boiling point than the compound represented by Chemical Formula 1 in a volume ratio of 1:5 to 100, and
wherein the mixture is supplied in a state where the internal temperature of a reactor is 100 to 400° C. so that the volatile polar solvent can be vaporized before contacting reactants in the reactor:

$$X_2O \qquad \text{Chemical Formula 1}$$

Wherein X is hydrogen or deuterium.

11. The method of preparing a quantum dot nanoparticle according to claim 10, characterized in that the anion precursors are input by 2 to 10 divisions during the reaction.

12. The method of preparing a quantum dot nanoparticle according to claim 11, characterized in that the cation precursors are input by 2 to 4 divisions during the reaction.

13. The method of preparing a quantum dot nanoparticle according to claim 1, further comprising the step of using the prepared quantum dot nanoparticle as a core and reacting one or more cationic shell precursors including one or more of Group 12 elements with one or more anionic shell precursors including one or more of Group 16 elements, together with the core.

14. The method of preparing a quantum dot nanoparticle according to claim 13, characterized in that Group 12 elements are zinc (Zn), and Group 16 elements are one or more selected from sulfur (S) and selenium (Se).

* * * * *